Patented June 8, 1954

2,680,694

UNITED STATES PATENT OFFICE 2,680,694

TALL OIL ROSIN SIZES STABILIZED WITH PHENOTHIAZINE PLUS DIARYLAMINES

Justus C. Barthel and Randall Hastings, Stamford, Conn., assignors to American Cyanamid Company, New York, N. Y., a corporation of Maine No Drawing. Application July 11, 1951,
Serial No. 236,274

6 Claims. (Cl. 106—218)

This invention relates to the stabilization of tall oil rosin and to the production therefrom of dry rosin size compositions of increased storage stability. The invention includes the stabilized tall oil rosins and their methods of preparation and also the stabilized size compositions and methods of preparing the same.

Tall oil rosin is now a recognized article of commerce for which a definite standard has been established by the U. S. Department of Agriculture. It is defined as rosin remaining after the removal of the fatty acids from tall oil by fractional distillation. The product has the characteristic form and appearance and other physical and chemical properties normal for other kinds of rosin, but is more highly purified. Because the original resins of the pine wood have been extracted by the paper pulp digester liquor and have been further refined by subsequent distillation, tall oil rosin contains little or none of the natural antioxidants that have assisted in stabilizing ordinary wood and gum rosins. For this reason the stabilization of sizes prepared therefrom has presented a definite problem.

We have found that tall oil rosin sizes can be stabilized by the action of a certain combination of antioxidants; namely, by the joint action of stabilizing quantities of phenothiazine and diarylamines. Although neither of these chemical antioxidants will provide a completely stabilized tall oil rosin size when used alone we have found that a tall oil rosin size possessing a much more stable chemical constitution, as shown by its increased storage stability, can be obtained by the joint action of these two classes of antioxidants. We have also found, as a very important feature of our invention, that optimum stabilization is obtained when the tall oil rosin is first disproportionated by heating it in the presence of the phenothiazine to a certain minimum specific rotation, the diarylamine stabilizer being added after the heat treatment.

The minimum quantity of phenothiazine plus diarylamine that will produce effective stabilization is about 0.5–0.75%, based on the weight of the tall oil rosin, of which at least 50% should be phenothiazine. Preferably, the amounts of phenothiazine and diarylamine are about 0.5–1% and 0.2–0.5% of the weight of the tall oil rosin, respectively. Larger amounts up to 2% of each ingredient may be used in extreme cases, but are ordinarily unnecessary.

The heat treatment of the tall oil rosin is preferably carried out at temperatures within the range of 250–325° C. for times of from 10 minutes to 2 hours; the exact temperature and time of heating can easily be regulated by following the optical rotation of the rosin. In general the heat treatment should be continued until the specific rotation of the tall oil rosin has increased from its normal value of about zero to a minimum value of about +25 or slightly less; in most cases the specific rotation will be in the range of +30 to +50 after a satisfactory heat treatment has been completed. As has been stated, the phenothiazine is preferably added to the tall oil rosin before the heat treatment is started; the diarylamine is incorporated after it is completed.

Although any suitable diarylamine may be employed, such as the secondary diarylamines and related compounds described in Dreshfield Patent No. 2,294,723, the preferred antioxidant of this class is diphenylamine. This material is available commercially in good quantity; its use as an antioxidant for dry sizes prepared from ordinary wood or gum rosin is well understood by those skilled in the art, and we therefore prefer to employ it in completing the stabilization of tall oil rosin and its soaps.

Dry sizes may be made from our stabilized tall oil rosin by any known or approved method. Liquid rosin sizes are ordinarily made by heating rosin with an aqueous solution of sodium or potassium carbonate, using about 9–16% of sodium carbonate or 12–21% of potassium carbonate based on the rosin and sufficient water (which may be added in portions during the saponification) to form a liquid size solution of about 70% solids. The saponification is ordinarily carried out at about 190–212° F. during about 6 hours. Liquid rosin sizes may be prepared from our stabilized tall oil rosins by this procedure, the diphenylamine or other diarylamine being added during the cook, and converted into dry sizes by drum-drying or spray-drying. Dry sizes may also be prepared by reacting the tall oil rosins with about 9–12% of sodium or 13–17% of potassium hydroxide in the form of concentrated aqueous solutions, whereby a dry composition of low moisture content can be produced directly.

From the foregoing it will be seen that our invention is directed to the treatment of tall oil rosin, and to the stabilization of dry rosin sizes prepared therefrom, by the combined action of phenothiazine and of a diarylamine antioxidant which is preferably diphenylamine. This combined treatment is necessary because tall oil rosin sizes cannot be completely stabilized by the addition of any one stabilizer. Thus, we added varying quantities up to 0.75–1% by weight of phenothiazine to ordinary tall oil rosin and subjected it to the heat treatment described in the following example. We then converted the heat treated and supposedly stabilized rosin into dry rosin size by reaction with aqueous sodium carbonate solution and subsequent drum drying. The resulting size, however, was unstable upon storage in contact with air; it became hot, darkened in color and finally ignited. Substantially the same result was obtained, after an even shorter storage time, when diphenylamine alone was tested as the stabilizer. In view of these test results, it was both unexpected and surprising to find that a mixture of the two antioxidants would provide complete stabilization, and would produce dry sizes that were free from spontaneous oxidation upon storage.

The invention will be further illustrated by the following specific example, which describes a preferred embodiment thereof.

*Example*

A commercial tall oil rosin obtained by the vacuum steam distillation and fractionation of tall oil was employed. This rosin had an acid number of 160, a color of M, a hardness of 0.5, a softening point of 70° C., a specific rotation of approximately zero and a rosin acids content of 86%.

A sample of this rosin was heated to 160° C. and 0.5% of its weight of phenothiazine was added and distributed uniformly. The sample was then heated with agitation to 300° C. during a period of about 1 hour and held at this temperature for 30 minutes and then allowed to cool. A small stream of carbon dioxide was introduced during the heat treating procedure to exclude atmospheric oxygen. The resulting product was a light-colored tall oil rosin having a specific rotation of +32.

The heat-treated rosin was reacted at 100° C. with 13% of its weight of sodium carbonate dissolved in sufficient water to make a 70% rosin size solution and during the reaction 0.25% of diphenylamine, based on the weight of the rosin, was added. The resulting solution was dried to a moisture content of about 1–3% on a polished drum heated with steam at 75 lbs. gage pressure. A sample of the resulting size was tested for oxidation resistance by an oxygen bomb test. This test is carried out by placing a sample in an atmosphere of commercially pure oxygen under 50 lbs. per square inch gage pressure maintained at 70° C. for 48 hours. The oxidation is then measured by a standard foam test, which is as follows:

To 180 ml. of demineralized water in the cup of a Hamilton Beach Drink Mixer there is added 20 ml. of a 5% solution of the size under test. A 5 ml. portion of a 10% aqueous solution of papermakers alum is then added and the mixture is agitated for 1 minute. The total volume is immediately measured in a 500 ml. graduate. The percent foam is calculated by the formula $$\text{Percent foam} = \frac{\text{Total volume (foam + solution)} - \text{solution volume}}{\text{Solution volume}} \times 100$$

When the above described rosin size was tested by this procedure the percent of foam was 12.2, indicating that the size was well stabilized and possessed good storage stability.

What we claim is:

1. A storage-stable dry rosin size consisting essentially of the dry saponification product of rosin remaining after the removal of the fatty acids from tall oil by fractional distillation, said size containing about 0.5–2% of phenothiazine and about 0.2–2% of a diarylamine based on the weight of said rosin.

2. A storage-stable dry rosin size consisting essentially of the dry saponification product of rosin remaining after the removal of the fatty acids from tall oil by fractional distillation, said size containing about 0.5–2% of phenothiazine and about 0.2–2% of diphenylamine based on the weight of said rosin.

3. A storage-stable dry rosin size consisting essentially of the dry saponification product of rosin remaining after the removal of the fatty acids from tall oil by fractional distillation disproportionated by heat treatment to a minimum specific rotation of about +25 after incorporating about 0.5–2% by weight of phenothiazine therein, said size also containing about 0.2–2% of a diarylamine based on the weight of said rosin.

4. A storage-stable dry rosin size consisting essentially of the dry saponification product of rosin remaining after the removal of the fatty acids from tall oil by fractional distillation disproportionated by heat treatment to a minimum specific rotation of about +25 after incorporating about 0.5–2% by weight of phenothiazine therein, said size also containing about 0.2–2% of diphenylamine based on the weight of said rosin.

5. A method of producing a storage-stable dry tall oil rosin size which comprises disproportionating rosin remaining after the removal of the fatty acids from tall oil by fractional distillation by heat treatment in the presence of about 0.5%–1% of phenothiazine to a minimum specific rotation of about +25, adding about 0.2% to 0.5% of a diarylamine, saponifying said rosin with a member of the group consisting of alkali metal carbonates and hydroxides and drying the product.

6. A method of producing a storage-stable dry tall oil rosin size which comprises disproportionating rosin remaining after the removal of the fatty acids from tall oil by fractional distillation by heat treatment in the presence of about 0.5%–1% of phenothiazine to a minimum specific rotation of about +25, adding about 0.2% to 0.5% of diphenylamine and saponifying said rosin with a member of the group consisting of alkali metal carbonates and hydroxides and drying the product.

References Cited in the file of this patent

UNITED STATES PATENTS

| Number | Name | Date |
|---|---|---|
| 2,311,386 | Hasselstrom | Feb. 16, 1943 |
| 2,395,278 | Kalman | Feb. 19, 1946 |
| 2,471,714 | Barthel | May 31, 1949 |
| 2,476,450 | Morris | July 19, 1949 |
| 2,497,882 | Hampton | Feb. 11, 1950 |
| 2,503,268 | Hasselstrom | Apr. 11, 1950 |